United States Patent Office 2,774,955
Patented Dec. 18, 1956

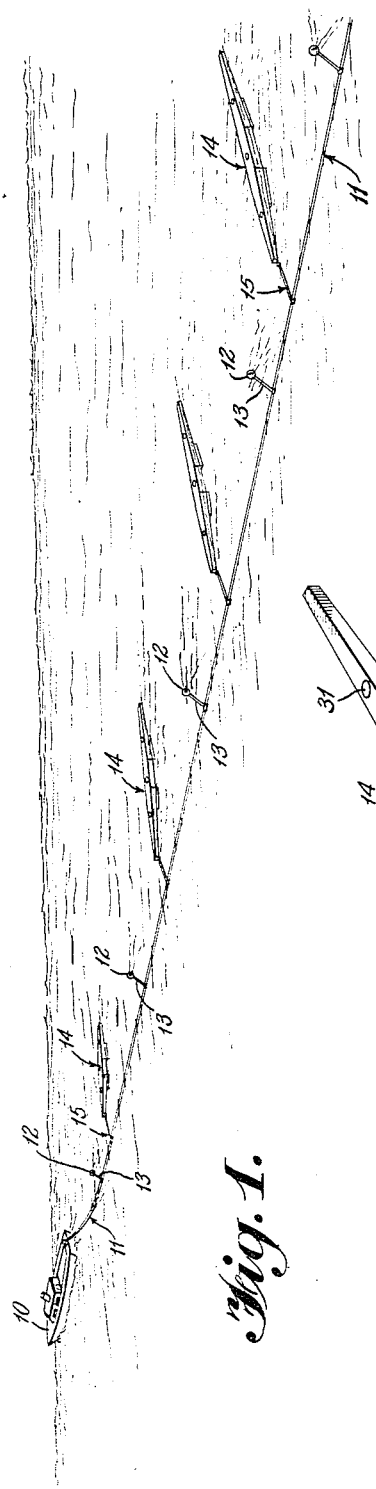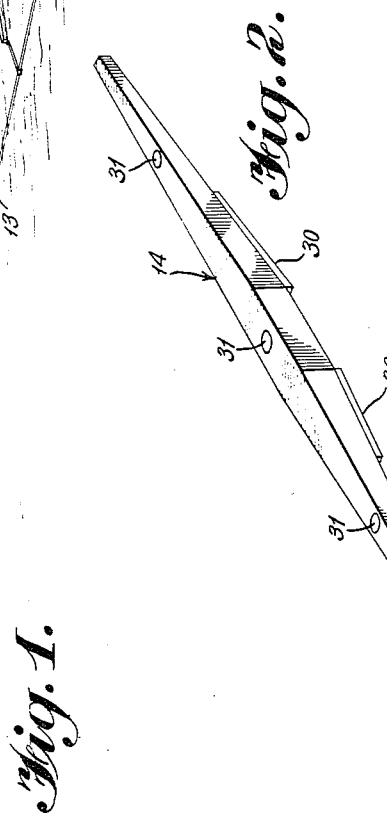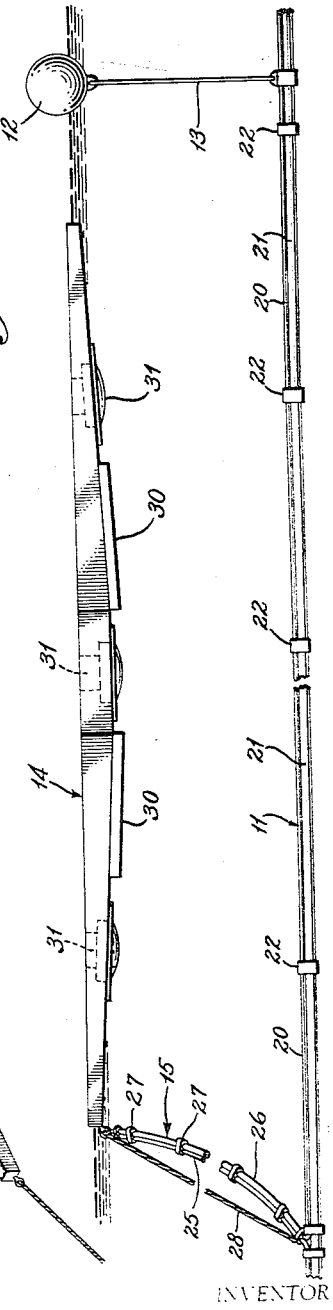

2,774,955
APPARATUS FOR SUBMARINE SEISMIC PROSPECTING

Eugene James Toomey, Dallas, Tex., assignor to Texas Instruments Incorporated, Dallas, Tex., a corporation of Delaware Application October 29, 1952, Serial No. 317,505

4 Claims. (Cl. 340—7)

This invention relates to a method and apparatus for use in the seismic investigation of geological formations that lie under bodies of water. This method and apparatus is particularly adaptable to use where the water is relatively shallow and the bottom is rough or uneven, but it is not limited to such uses and may also be used where the water is deep and where the bottom is smooth.

The usual practice of seismic prospecting on land consists in positioning a group of seismometers in spaced relation to each other on the surface of the earth and then detonating a charge of explosive buried some distance in the earth. This practice has not been followed when the area to be surveyed is covered by water. The practice in areas covered by water has not as yet become standard but several methods, each different from the one commonly used on land, have been used.

One method sometimes used in water consists in dragging a weighted cable behind a boat and fastening a series of spaced seismometers to this cable by relatively short leads. The seismometers are then buoyed to make them slightly less in specific gravity than the surrounding water, so that the cable will continue to drag along the bottom and the seismometers will then position themselves a short distance above the cable and be spaced from one another along the cable. The tow boat can then stop at any desired point and detonate a charge of explosive in the water, usually at some position spaced laterally from the line of seismometers. The seismometers will pick up the resulting seismic waves and convert them into electrical signals which will then be transmitted through the cable connections to the tow boat where a recording oscillograph is stationed. The tow boat will then proceed to the next location dragging the cable and seismometers behind it.

In another arrangement, the seismometers are similarly dragged behind a tow boat but are constructed so as to be heavier than water so that when the tow boat stops the seismometers come to rest on the bottom. The seismometers may be fitted with vanes so that they will rise from the bottom as they are pulled forward and will thus be prevented from dragging on the bottom during the forward motion of the tow boat.

In still another arrangement the seismometers are all connected together in a spaced series and are all floated on top of the water.

None of these previous arrangements have been found entirely satisfactory. Those in which the seismometers or a part of the equipment is dragged along the bottom of the body of water generally cause trouble when the bottom is rough or the water is shallow. Even under most favorable conditions the equipment is apt to become fouled on some subterranean object and thus injured or lost. Those that float on the surface have heretofore been unsatisfactory because of interference with the determinations caused by wind, current, surface waves and other unwanted disturbances.

According to the present invention, seismic prospecting of areas lying under bodies of water may be more efficiently and more satisfactorily accomplished by the use of a series of seismometers mounted in spar-type floats constructed to ride awash and not to have a resonant frequency in the range of the seismic vibrations of interest. These spar-type seismometer platforms are connected to a buoyed tow and conductor cable at spaced points along its length through branch connecting cables, one for each spar-type seismometer platform, and each long enough so that the spar-type seismometer platform can orient itself with respect to the wind and waves and thus further minimize the effect of any of these disturbing influences on the readings of the seismometers.

Further details and advantages of this invention will be apparent from the following detailed description of a preferred embodiment of the apparatus for carrying the method of this invention into effect. This apparatus is shown in the accompanying drawings in which:

Figure 1 is a perspective view illustrating the overall arrangement of the apparatus of this invention;

Figure 2 is a perspective view of one of the spar-type seismometer platforms constructed in accordance with this invention; and Figure 3 is an elevationtal view of a part of a system constructed in accordance with this invention, the view showing the manner in which a spar-type seismometer platform is connected to the main cable and in which the main cable is supported by floats.

As illustrated in the drawings, a boat 10 carrying the necessary recording equipment drags behind it a cable 11 that serves both as an electrical conductor and also as a towing cable. To this cable floats 12 are attached at spaced points so that the cable will remain relatively close to the surface of the water. Generally, it is preferred to attach the floats 12 to the cable 11 by short links of cable 13 in order that the cable 11 will ride below the waves or surface ripple and hence, will not be disturbed thereby.

At spaced points along the cable 11 spar-type seismometer platforms 14 are attached by short connector cables 15. These connector cables 15 are of sufficient length so that the spar-type seismometer platforms may easily orient themselves with respect to the wind and waves once the forward progress of the tow boat 10 has stopped.

The number and spacing of the spars and buoys is not critical nor is it necessarily as shown by the drawings. Usually the spacing will be much greater than there is room to indicate on the drawings and there may be several buoys between each pair of spars and as many spars as is desired.

In operation the tow boat 10 tows the array to the desired location, stops and detonates a charge of explosive at some point spaced from the array of seismometer platforms. The tow boat 10 then tows the string of seismometer platforms to a new location, stops, permits the seismometer platforms to orient themselves and again detonates a charge of explosive.

The recording equipment for the seismograph determinations is carried by the tow boat 10 and is conventional construction and therefore need not be described in detail. Similarly, any conventional means of creating a seismic disturbance may be used and this need not be specifically described.

The cable 11 performs the dual purpose of towing the array and conducting currents indicative of the seismometer readings from the seismometers to the recording equipment in the tow boat 10. Therefore this cable is preferably made up of a mechanically strong towing cable 20 and a multi-conductor insulated electrical cable 21 fastened together by spaced windings or collars 22. It is supported at spaced points by floats 12 connected to it by short links of cable 13. The short lengths of cable 13 are of such length as will permit the towing and conductor cable to stay below the surface and avoid being disturbed by waves and wind or becoming entangled with the spars 14.

Spar-type seismometer platforms 14 are connected to the cable 11 by short cables 15, each of which consists of a towing cable 25 and a conducting cable 26, the two being bound together by wrappings or collars 27. In addition, it is usually desirable to connect the spar-type seismometer platforms to the main cable by shock cord 28 which is elastic in nature and tends to keep some slack in the connecting cable 15. This avoids the transmission of shocks between the main cable and the seismometer platform, in either direction. Thus, sudden movements of the cable will not appreciably affect the seismometers on the seismometer platform and sudden movements of the seismometer platform will not send shocks to the cable which in turn might be transmitted to other seismometer platforms.

The seismometer platform itself is generally constructed of wood and is tapered from the center toward the ends as illustrated in the drawing. It is preferably weighted by lead weights 30 and it will usually carry several seismometers 31, although it may carry only a single seismometer if desired. The dimensions of the seismometer platform are not critical but it has been found that a length of about 14 feet is sufficient to minimize the effect of wind and small waves upon the seismometers.

It has also been found by weighting the seismometer platform so that it rides just about awash, the effect of the waves and the wind on the seismometer platform is still further minimized. In other words, the seismometer platform is weighted until is has a specific gravity that is only slightly less than the water in which it is to be used. Then, when it is floated in water and permitted to swing end-on to the waves it will encounter, the waves tend to simply wash over it instead of tossing it about.

The natural frequency of any seismometer platform can be determined only by test and experiment but is easy by changing the shape and weight slightly to adjust its natural frequency it has been found desirable to be certain that the natural frequency of the seismometer platforms of this invention falls outside of the range of frequencies to be recorded. In other words, the natural frequency of the seismometer platform should be well above a hundred cycles a second or below about ten cycles per second.

The use of several seismometers in a spar has also been found expedient. By connecting the several seismometers in a single spar together there appears to be a tendency to balance out many unwanted disturbances.

What is claimed is:

1. Apparatus for submarine seismic prospecting that comprises a power driven vessel, a cable adapted to be towed by said vessel and to tow other objects, float and cable means adapted to suspend said cable a short distance below the surface of the water as it is towed by the vessel, a series of elongated horizontally surface floating seismometer platforms, a series of connector cables, each connected at one end with one of said platforms and at its other end with said cable, said series of platforms being connected via said series of connector cables at spaced intervals along said cable, said connector cables being of a length to enable said platforms to float on the surface and swing freely in any direction when not being towed so that said platforms can orient themselves in conformity with wind, waves, and other surface disturbances, at least one seismometer carried by each seismometer platform, each said platform and seismometer combination having a specific gravity only slightly less than that of the water in which it is to operate whereby said platform and seismometer combination will ride in the water substantially awash, electrical connections from each seismometer to the towing vessel, and amplifying and recording equipment on the towing vessel for recording the outputs of the seismometers.

2. An apparatus as defined in claim 1 in which each said platform is characterized by a natural frequency outside the range of frequencies lying between 10 and 100 cycles per second.

3. Apparatus as defined in claim 1 in which each seismometer platform carries a plurality of seismometers.

4. Apparatus as defined in claim 1 in which the connection between the seismometer platform and the towing cable consists of a connecting cable and a length of shock cord slightly shorter than the connecting cable, and adapted to absorb the shocks of any sudden relative movements of the cable and seismometer platform.

References Cited in the file of this patent

UNITED STATES PATENTS

| 2,241,428 | Silverman | May 13, 1941 |
| 2,324,378 | Flude | July 13, 1943 |
| 2,449,085 | Peterson | Sept. 14, 1948 |
| 2,544,819 | Babb et al. | Mar. 13, 1951 |
| 2,572,255 | Gallaway | Oct. 23, 1951 |
| 2,607,842 | Reid | Aug. 19, 1952 |